US006806730B2

(12) United States Patent
Bailis et al.

(10) Patent No.: US 6,806,730 B2
(45) Date of Patent: Oct. 19, 2004

(54) METHOD AND SYSTEM FOR USE OF AN EMBEDDED FIELD PROGRAMMABLE GATE ARRAY INTERCONNECT FOR FLEXIBLE I/O CONNECTIVITY

(75) Inventors: Robert Thomas Bailis, Cary, NC (US); Charles Edward Kuhlmann, Raleigh, NC (US); Charles Steven Lingafelt, Durham, NC (US); Ann Marie Rincon, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/016,772

(22) Filed: Dec. 10, 2001

(65) Prior Publication Data

US 2003/0107399 A1 Jun. 12, 2003

(51) Int. Cl.[7] .......................... G06F 7/38; H03K 19/173
(52) U.S. Cl. ........................................ 326/38; 326/41
(58) Field of Search ............................. 326/37, 38, 39, 326/40, 41

(56) References Cited

U.S. PATENT DOCUMENTS 6,211,697 B1 * 4/2001 Lien et al. .................... 326/41

* cited by examiner

Primary Examiner—Daniel D. Chang
(74) Attorney, Agent, or Firm—Sawyer Law Group LLP

(57) ABSTRACT

An application specific integrated circuit (ASIC) is disclosed. The ASIC comprises a standard cell, the standard cell including a plurality of logic functions. The ASIC further includes at least one FPGA interconnect coupled to at least a portion of the logic functions. The FPGA interconnect can be configured to select a particular logic function of the plurality of logic functions. An ASIC in accordance with the present invention allows "field selection" of functions that are connected to the internal bus(es) and to external I/O. In addition, functional block connections made with internal buses can be significantly wider and faster than buses brought on chip via external chip I/Os. Further, the ASIC reduces cost because selective bus connections can be made internal to the chip, thus eliminating the need for external pins. Finally, the ASIC reduces the cost of the packaged component by allowing the chip to be packaged in a lower pin count package.

11 Claims, 3 Drawing Sheets

100

METHOD AND SYSTEM FOR USE OF AN EMBEDDED FIELD PROGRAMMABLE GATE ARRAY INTERCONNECT FOR FLEXIBLE I/O CONNECTIVITY

CROSS-RELATED APPLICATIONS

The present application is related to the following listed seven applications: Ser. No. 10/016,346 [(RPS920010125US1)] entitled "Field Programmable Network Processor and Method for Customizing a Network Processor;" Ser. No. 10/016,449 [(RPS920010127US 1)], entitled "Method and System for Use of a Field Programmable Gate Array (FPGA) Function Within an Application Specific Integrated Circuit (ASIC) to Enable Creation of a Debugger Client Within the ASIC;" Ser. No. 10/016,448 [(RPS 920010128US1)], entitled "Method and System for Use of a Field Programmable Function Within an Application Specific Integrated Circuit (ASIC) To Access Internal Signals for External Observation and Control;" Ser. No. 10/015,922 [(RPS920010129US1)], entitled "Method and System for Use of a Field Programmable Interconnect Within an ASIC for Configuring the ASIC;" Ser. No. 10/015,920 [(RPS920010130US1)], entitled "Method and System for Use of a Field Programmable Function Within a Chip to Enable Configurable I/O Signal Timing Characteristics;" Ser. No. 10/015,923 [(RPS920010131US1)], entitled "Method and System for Use of a Field Programmable Function Within a Standard Cell Chip for Repair of Logic Circuits;" and Ser. No. 10/015,921 [(RPS920010132US1)], entitled "Method and System for Use of a Field Programmable Gate Array 9FPGA) Cell for Controlling Access to On-Chip Functions of a System on a Chip (S)C) Integrated Circuit;" assigned to the assignee of the present application, and filed on the same date.

FIELD OF THE INVENTION

The present invention generally relates to an application specific integrated circuit and specifically to the use of an FPGA interconnect for flexible I/O connectivity.

BACKGROUND OF THE INVENTION

Today's ASIC standard cell designs are often I/O limited, that is, the amount of logic that is placed on a chip is often limited by the number of input/output pins available to connect the logic with the outside world. As a result silicon area that could contain additional function is wasted. Using a larger die than necessary for the logical function in order to obtain sufficient input/output pins adds cost to the product without adding value. Chips designed to support multiple applications may contain multiple functions only one of which is used for a particular application. If an on-chip function could be selectively connected to chip input/output pins based on the application using the chip, then the chip could be implemented with fewer I/O than if all functions had to be wired out at all times. In this case both the chip silicon and chip I/O could be fully utilized, eliminating wasted silicon area, and multiple markets could be satisfied by the same chip.

Today chip designers are often forced to go with a larger chip size than required by the logical function in order to obtain the number of I/O pins required by the design. This adds cost to the product without adding any functional value. The additional cost comes from paying for a larger, more expensive chip than required and also through potential yield loss due to fewer chips per wafer.

Providing chips with functions specific to a particular application may today be implemented as multiple separate part numbers, which is less efficient and more costly in terms of design time and inventory than a single configurable part.

Another problem is when a reversed bit ordering wiring errors are made on the printed circuit board when implementing an ASIC. The reversed bus bit ordering on a PCB is a common problem and is usually solved by re-fabbing the board or by adding "jumper wires" to the incorrectly wired board to correct the ordering. These methods are expensive and time consuming and can impact the overall time-to-market of the design.

The pin reconfiguration can also be accomplished within standard cell chips using standard cell registers to control the reconfiguration of the I/O. Using registers for pin reconfiguration can be effective, but does not work in all cases Examples include 1) when the configuration determination needs to be made prior to being able to write into the standard cell registers, or 2) there is no processor in the system that can write configuration information into the registers.

Accordingly, what is needed is a system and method that provides this functionality. The present invention addresses such a need.

SUMMARY OF THE INVENTION

An application specific integrated circuit (ASIC) is disclosed. The ASIC comprises a standard cell, the standard cell including a plurality of logic functions. The ASIC further includes at least one FPGA interconnect coupled to at least a portion of the logic functions. The FPGA interconnect can be configured to select a particular logic function of the plurality of logic functions.

An ASIC in accordance with the present invention allows "field selection" of functions that are connected to the internal bus(es) and to external I/O. The functional block connections made with internal buses can be significantly wider and faster than buses brought on chip via external chip I/Os. Further, the ASIC reduces cost because selective bus connections can be made internal to the chip, thus eliminating the need for additional external pins. Finally, the ASIC reduces the cost of the packaged component by allowing the chip to be packaged in a lower pin count package.

DETAILED DESCRIPTION

The present invention generally relates to an application specific integrated circuit and specifically to the use of an FPGA interconnect for flexible I/O connectivity. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a system and method in accordance with the present invention, the selective connection of internal logic blocks to chip I/O is accomplished using an embedded field programmable gate array (FPGA) on the standard cell chip containing the multiple functions. To describe the present invention in more detail refer now to the accompanying description in conjunction with the accompanying Figure.

Figure 1:
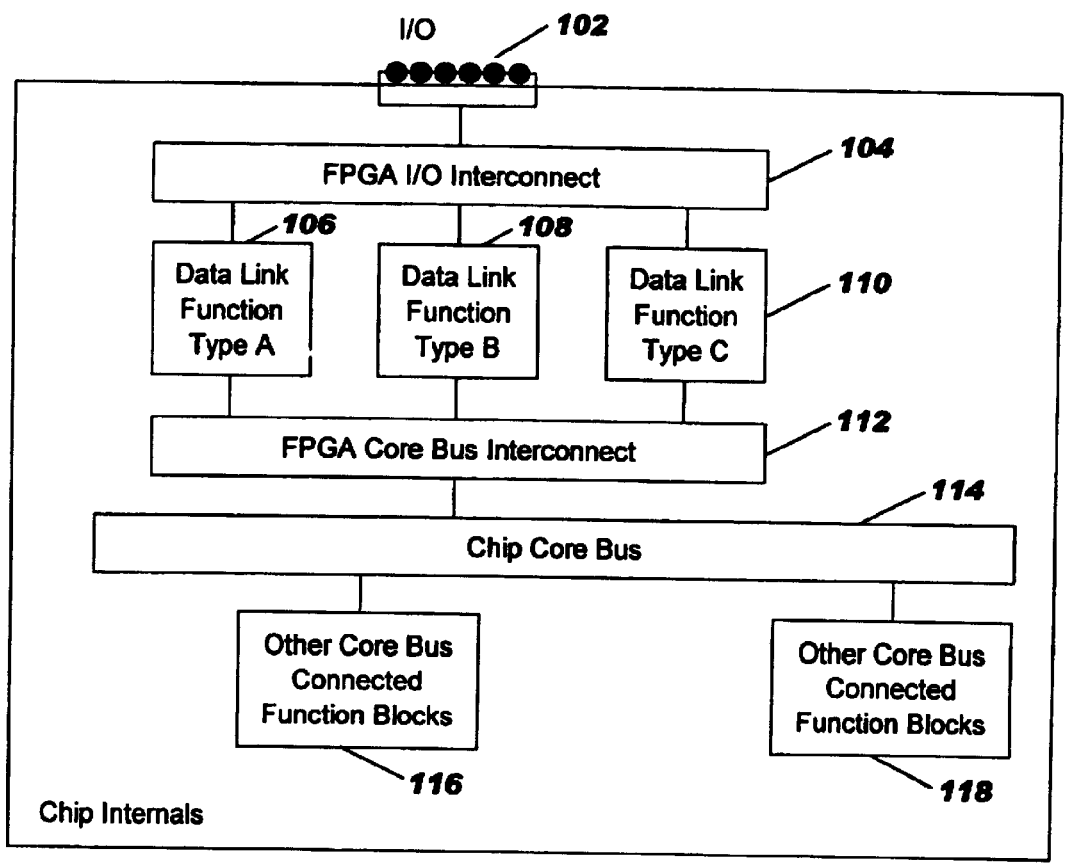
FIG. 1 is an embodiment of an ASIC 100 which includes a plurality of logic functions on a standard cell which can be selectively connected utilizing FPGA cells

FIG. 1 is an embodiment of an ASIC 100 which includes a plurality of logic functions on a standard cell, which can be selectively connected utilizing FPGA, interconnects. In this embodiment, I/O pins 102 are coupled to a first FPGA interconnect 104. The first FPGA interconnect 104 in turn can be coupled to data link functions 106, 108 or 110.

These data link functions 106–110 can be different functions, variations on the same function or any combination thereof. A second FPGA core interconnect 112 is coupled between the data link functions 106–110 and a bus 114. The bus 114 in turn is coupled to functional blocks 116 and 118. The number of data link functions and functional blocks are not limited in any manner.

Accordingly, the FPGA interconnect 104 can be configured to selectively connect one of the data link functions 106–110 to the I/O pins 102 via loading the appropriate configuration information into the interconnect 102 preferably via a read only memory (ROM) (not shown). The FPGA core interconnect 112 similarly can selectively connect one of data link functions 106–110 to the core bus 114. Many functions could be connected in this manner including memory controller interfaces, various hardware accelerators, network processor functions, etc.

Another example of the utility of the present invention is that a general purpose chip may have multiple functions of which only one function of the set is active for a given specific customer application. An example of this is different memory interfaces that may require different I/O function. The customer, at chip usage time, not at chip design time, can determine which memory interface is desirable and then map the logical I/O to the physical I/Os. This also implies that one can, "in the field" (post production), change the I/O logical mapping by changing the FPGA function, thus enabling heretofore impossible field upgrading of systems. An example of this is the need to move from one type of memory to another.

Figure 2:
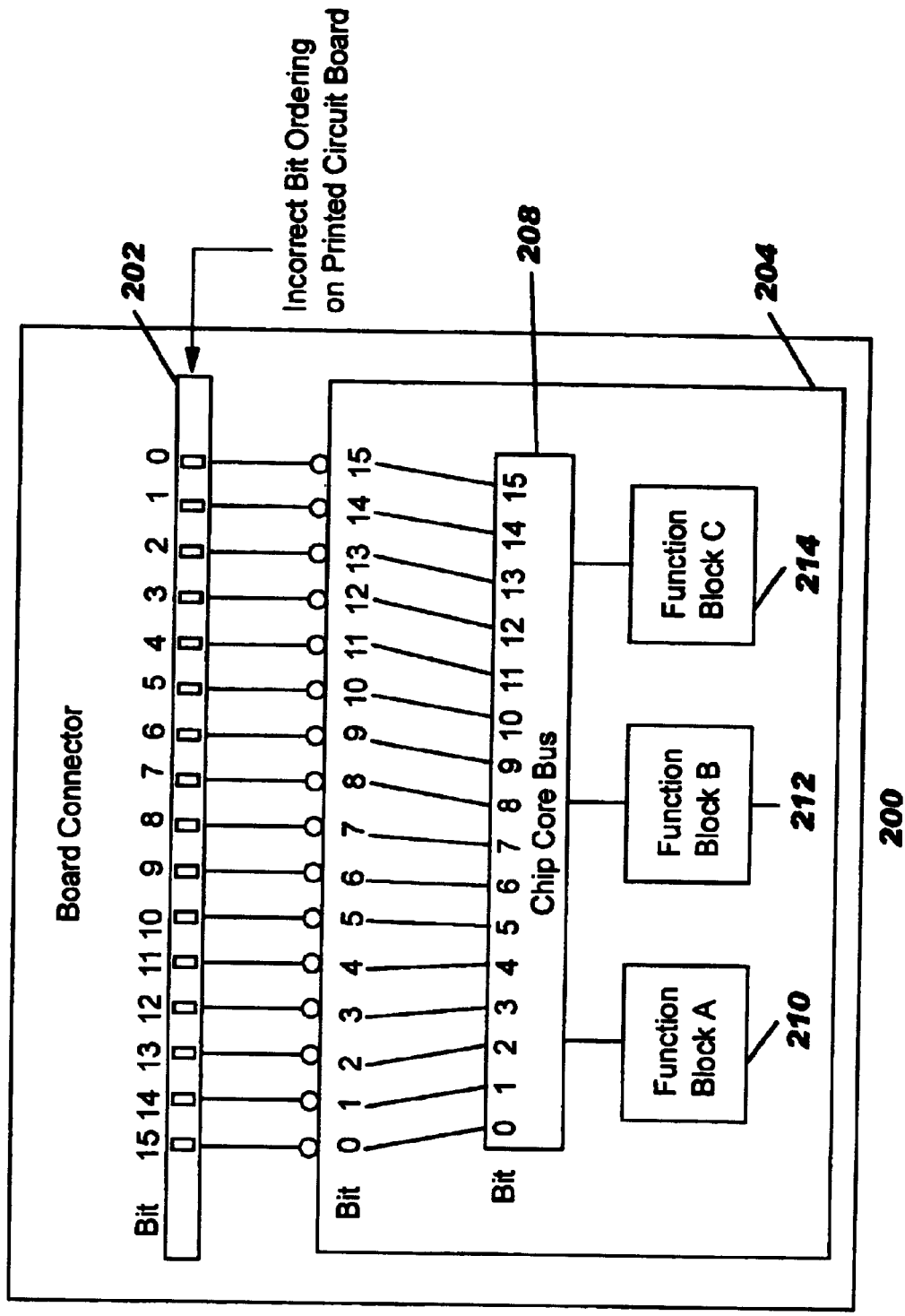
FIG. 2 shows a printed circuit board where the bus bit ordering is incorrect.

An embedded FPGA interconnect in accordance with the present invention can also be used to correct wiring errors made on printed circuit boards. A frequently made design error on printed circuit boards is the reversal of bus bit orderings, i.e., "wiring the bus backwards." An example of this is shown in FIG. 2. When this happens, the PBC design must be corrected and the board remanufactured. Both money and chip debug time are lost waiting for the second lot of corrected PBC boards to arrive.

Figure 3:
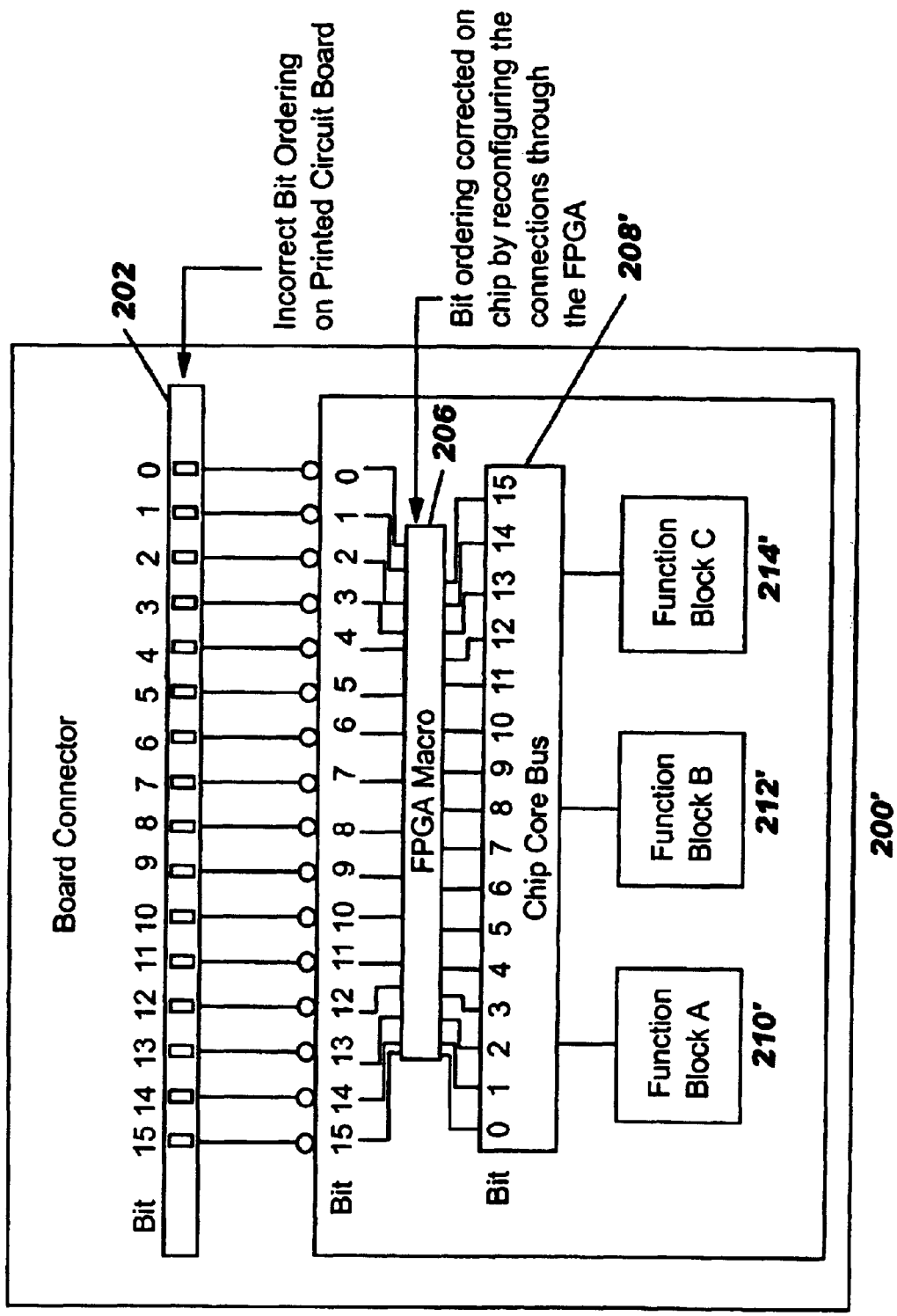
FIG. 3 is a block diagram of a board, which includes an FPGA cell for reversing the bit ordering.

FIG. 3 is a block diagram of a board 200, which includes an FPGA, interconnect 206 cell for reversing the bit ordering. The board 200 includes a board connector 202 in which the bit ordering is incorrect (i.e., in reversed wiring order.) The bits of the connector are in the opposite order of the pins on the ASIC 204. The pins on the board are coupled to an FPGA interconnect 206 on one side. The bus 208 is coupled to the FPGA cell interconnect 206 on an opposite side. A plurality of functional blocks 210–214 are coupled to the bus 208. In a system and method in accordance with the present invention, the bus bit ordering is corrected by reconfiguring the wiring through loading the proper wiring information into the embedded FPGA interconnect 206. This ability to reverse bus bit ordering on-chip could also make the same chip usable on cards that use different bit ordering schemes.

The advantages of connecting on-chip functions using an FPGA interconnect are:

1. Allows "field selection" of functions that are connected to the internal bus(es) and to external I/O.
2. Functional block connections made with internal buses can be significantly wider and faster than buses brought on chip via external chip I/Os.
3. Reduces cost because selective bus connections can be made internal to the chip, thus eliminating the need for external pins.
4. Reduces the cost of the packaged component by allowing the chip to be packaged in a lower pin count package.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An application specific integrated circuit (ASIC) comprising:

a standard cell, the standard cell including a plurality of logic functions; and at least one FPGA interconnect coupled to the plurality of functions, wherein the at least one FPGA interconnect can be configured to select one of the plurality of logic functions, wherein the at least one FPGA interconnect can be utilized to correct a wiring error on a printed circuit board by reconfiguring connections through the at least one FPGA interconnect.

2. The ASIC of claim 1 wherein the one logic function is coupled to a plurality of I/O pins by the at least one configured FPGA interconnect.

3. The ASIC of claim 1 wherein the one logic function is coupled to an internal bus via the at least one configured FPGA interconnect.

4. An application specific integrated circuit (ASIC) comprising:

a standard cell, the standard cell including a plurality of logic functions;

a plurality of input output (I/O) pins; and at least one field programmable gate array (FPGA) interconnect coupled to the plurality of I/O pins and the plurality of logic functions, wherein the at least one FPGA interconnect can be configured to select one of the plurality of logic functions utilizing field programming techniques, wherein the at least one FPGA interconnect can be utilized to correct a wiring error on a printed circuit board by reconfiguring connections through the at least one FPGA interconnect.

5. The ASIC of claim 4 wherein the one logic function is coupled to an internal bus via the at least one configured FPGA interconnect.

6. An application specific integrated circuit (ASIC) comprising:

a standard cell, the standard cell including a plurality of logic functions;

at least one internal bus; and at least one field programmable gate array (FPGA) interconnect coupled to at least one internal bus and the plurality of logic functions, wherein the at least one FPGA interconnect can be configured to select one of the plurality of logic functions utilizing field programming techniques, wherein the at least one FPGA interconnect can be utilized to correct a wiring error on a printed circuit board by reconfiguring connections through the at least one FPGA interconnect.

7. The ASIC of claim 6 wherein the one logic function is coupled to a plurality of I/O pins by the at least one configured FPGA interconnect.

8. An application specific integrated circuit (ASIC) comprising:
 a standard cell, the standard cell including a plurality of logic functions;
 at least one bus coupled to the plurality of functions;
 a plurality of I/O pins; and
 at least one FPGA interconnect coupled between the at least one bus and the plurality of I/O pins, wherein the at least one FPGA interconnect can be utilized to correct a wiring error on a printed circuit board by reconfiguring connections through the at least one FPGA interconnect.

9. The ASIC of claim 8 wherein the wiring error is a reversed bit order wiring error.

10. An application specific integrated circuit (ASIC) comprising:

a plurality of I/O pins;
 a plurality of first logic functions provided as part of a standard cell;
 a first field programmable gate array (FPGA) interconnect coupled between the plurality of I/O pins and the plurality of first logic function, wherein the first FPGA interconnect can be configured to select at least one of the plurality of first logic functions, wherein the first FPGA interconnect can be utilized to correct a wiring error on a printed circuit board by reconfiguring connections through the first FPGA interconnect;
 a bus coupled to the plurality of first logic functions; and
 a second FPGA interconnect coupled between the bus and the plurality of first logic functions, wherein the second FPGA interconnect is configured to connect to one of the plurality of first logic functions to the bus.

11. The ASIC of claim 10 which includes a plurality of second logic functions coupled to the bus.

* * * * *